United States Patent [19]
Lowry

[11] 3,969,007
[45] July 13, 1976

[54] CASSETTE DISPENSER

[75] Inventor: Alan B. Lowry, Canton, Mass.

[73] Assignee: Data Packaging Corporation, Cambridge, Mass.

[22] Filed: Feb. 21, 1975

[21] Appl. No.: 551,513

[52] U.S. Cl. .................................. 312/15; 206/387
[51] Int. Cl.² ....................................... A47B 81/06
[58] Field of Search .................. 312/10, 15, 16, 71, 312/18; 16/DIG. 13; 206/387

[56] References Cited
UNITED STATES PATENTS

| | | | |
|---|---|---|---|
| 2,330,173 | 9/1943 | Gordon, Jr. et al. | 312/15 |
| 2,475,495 | 7/1949 | Haag | 312/15 |
| 3,107,816 | 10/1963 | Teague, Jr. et al. | 312/18 X |
| 3,415,585 | 12/1968 | Morris | 312/10 X |
| 3,506,318 | 4/1970 | Neyroud | 312/15 |
| 3,866,990 | 2/1975 | McRae | 312/15 |

FOREIGN PATENTS OR APPLICATIONS

| 756,905 | 4/1967 | Canada | 206/52 F |
|---|---|---|---|

Primary Examiner—James T. McCall
Attorney, Agent, or Firm—Wolf, Greenfield & Sacks

[57] ABSTRACT

The dispenser holds a plurality of like cassettes in vertical juxtaposition in separate holding compartments each having a hinged member and integral release key associated therewith upon actuation of which a selected cassette is at least partially expelled from the dispenser. Each key includes a lip for normally maintaining the cassette locked in its holding compartment.

11 Claims, 9 Drawing Figures

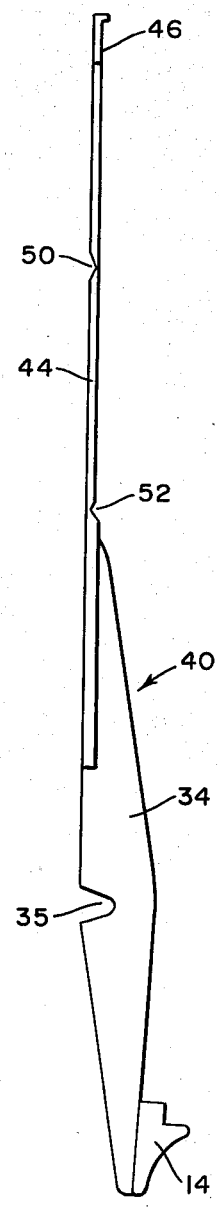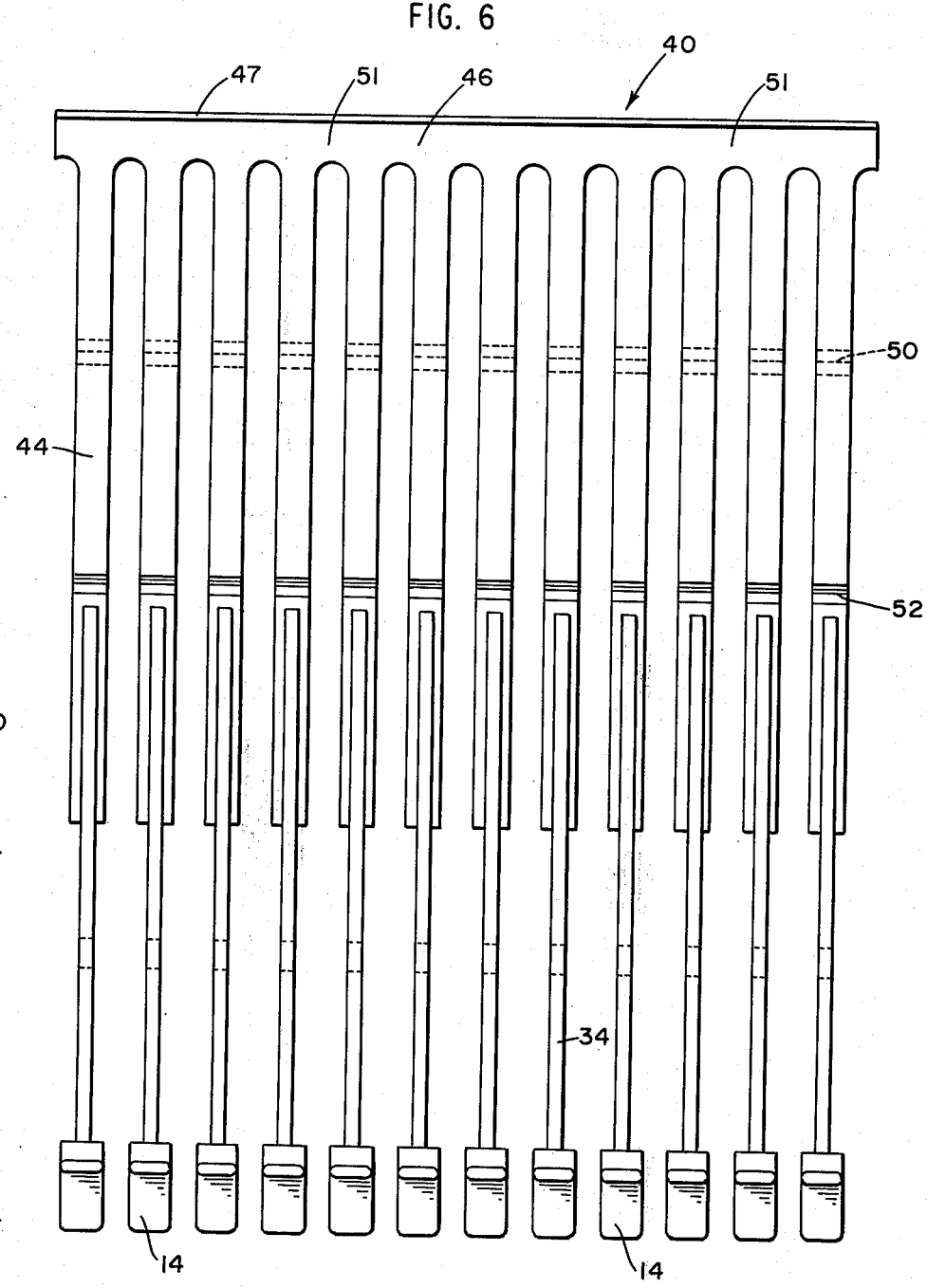

CASSETTE DISPENSER

BACKGROUND OF THE INVENTION

The present invention relates, in general, to a dispenser for tape cassettes. More particularly, this invention relates to a cassette dispenser for housing a plurality of tape cassettes all of which can be locked in position and are individually selectively key releasable from the dispenser.

A variety of cassette cabinets and dispensers have appeared on the market in recent years as a result of the very substantial commercial acceptance of cassettes in the music industry. However, all have certain disadvantages. For example, those dispensers which are key operated have complex, multipart mechanisms that are expensive to manufacture and difficult to assemble. In addition, many are quite large for their limited capacity.

Accordingly, one object of the present invention is to provide an improved dispenser for tape cassettes.

Another object of the present invention is to provide a tape cassette dispenser that permits compact arrangement for the cassettes.

Still a further object of the present invention is to provide a cassette dispenser that preferably has a unitary key release structure and that is relatively simple in design and can be fabricated in a single operation.

Another object of the present invention is to provide a cassette dispenser that is very easy to assemble.

A further object of the present invention is to provide a cassette dispenser having a plurality of release keys for selectively releasing the cassettes for use and wherein each key also functions as a lock for maintaining the cassette in the dispenser when the key is not actuated.

SUMMARY OF THE INVENTION

To accomplish the foregoing and other objects of this invention the cassette dispenser comprises preferably rectangular housing having a number of partitions that divide the housing into a plurality of cassette accommodating compartments. A key is associated with each cassette and has means for locking the cassette in the compartment when the key is in the biased position. The key preferably is integrally formed with a hinge member extending vertically along the back of the housing. The hinge member is movable upon actuation of a key to urge the cassette from the dispenser. Individual hinge members are associated with each cassette.

In accordance with the present invention, there is also provided a novel means for partitioning the housing into separate compartments. this means includes a wall segment that is properly relieved so that the cassettes substantially abut each other at their widest portion so as to maximize storage capacity within the housing.

BRIEF DESCRIPTION OF THE DRAWINGS

Numerous other objects, features and advantages of the invention will become apparent upon a reading of the following detailed description taken in conjunction with the accompanying drawings, in which:

FIG. 6 is a plan view showing the key release mechanism of the present invention in a flat condition;

FIG. 7 is an end view of the structure shown in FIG. 6;

Detailed Description

The dispenser of the present invention may be molded of plastic or other suitable material and in the form shown is designed to house twelve tape cassettes 10. The dispenser housing 12 is formed in two halves 12A and 12B, and after all of the parts comprising the dispenser are assembled, the two housing halves may be suitably joined by such well known techniques as ultrasonic welding or by providing a snap fit between the halves.

Figure 1:
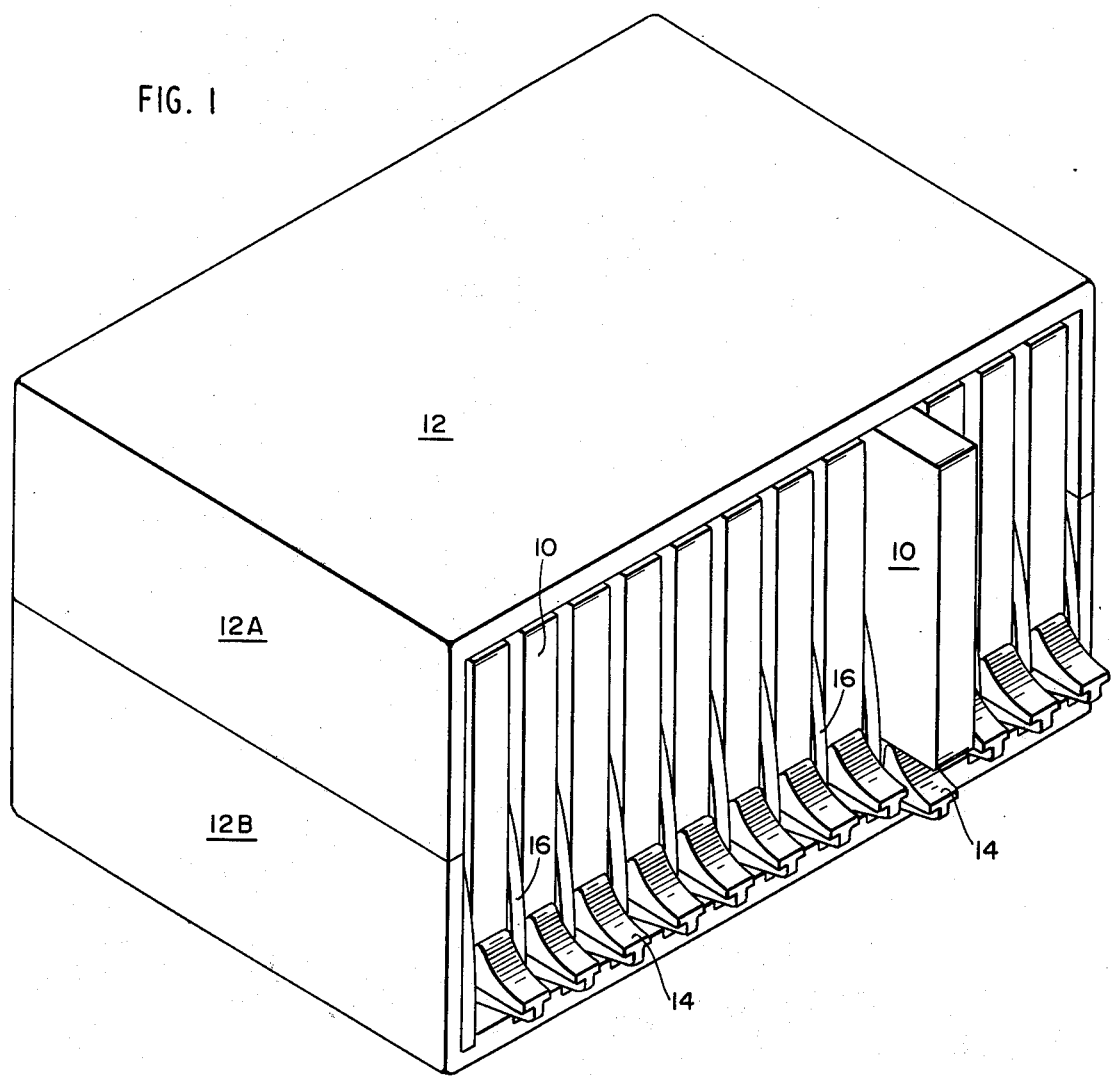
FIG. 1 is a perspective view of the dispenser of the present invention.

FIG. 1 shows all of the cassettes 10 locked in place in the dispenser with the exception of one cassette which is shown slightly protruding from the dispenser. These cassettes are selectively removable upon actuation of the key 14 associated with each cassette. As discussed in more detail hereinafter, the key also functions as a lock for maintaining the cassette in the dispenser except when the key has been depressed sufficiently to permit the cassette to slide thereover as illustrated in FIG. 1 in connection with one of the cassettes.

Figure 8:
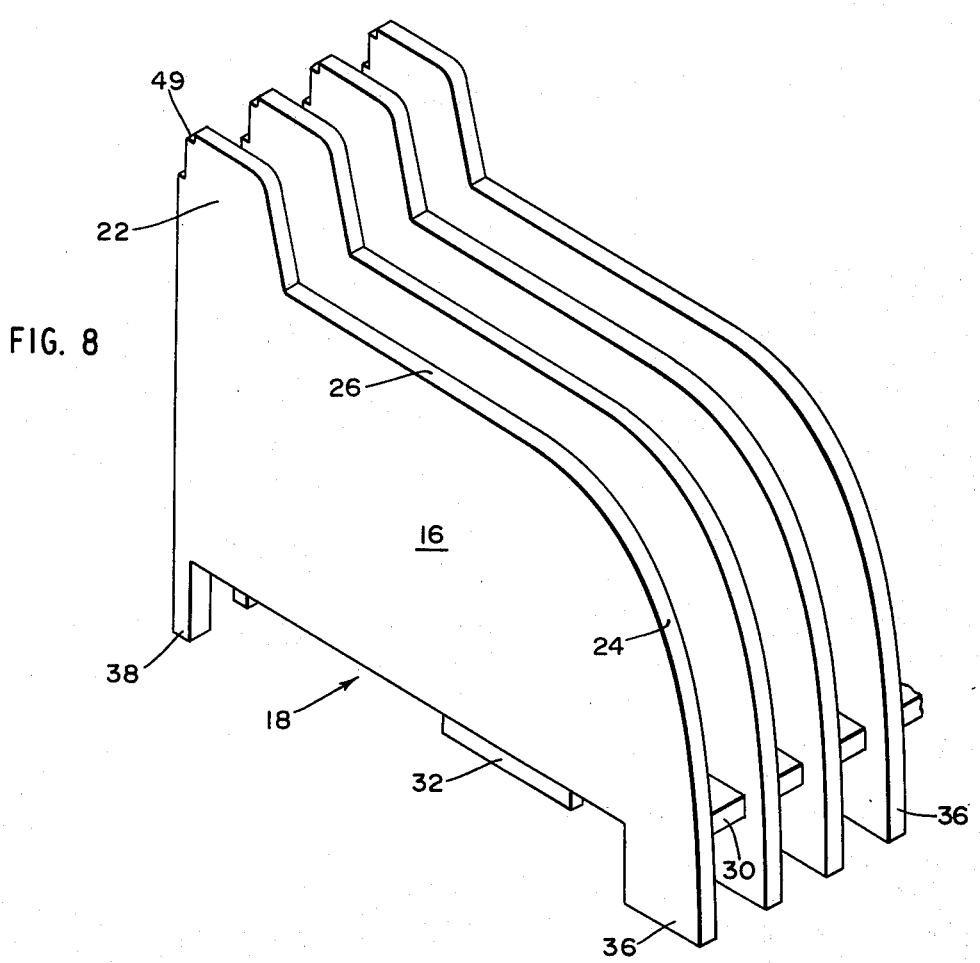
FIG. 8 is a top perspective view showing a segment of the partitioning wall shown in FIG. 2.
Figure 9:
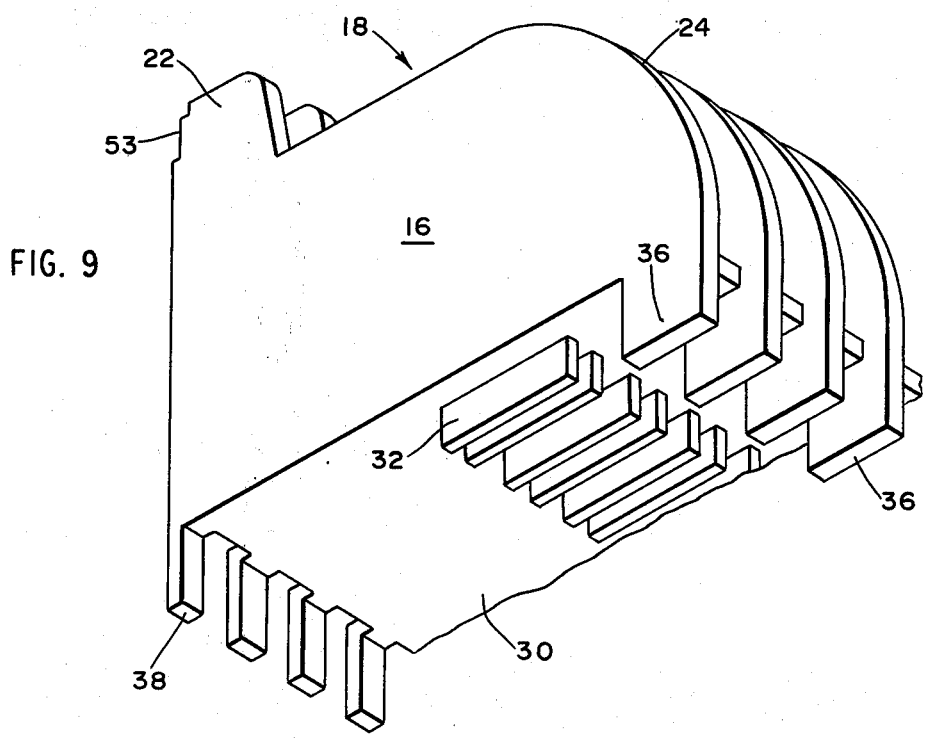
FIG. 9 is a bottom perspective view of the structure shown in FIG. 8.

In FIG. 1 the cassettes are of standard construction and are shown in more detail in FIGS. 2-5. There may be provided different types of partitioning walls or segments thereof to separate the dispenser into juxtaposition compartments. FIG. 1 shows a plurality of partitioning walls 16 which separate the dispenser into the plurality of cassette accommodating compartments. FIGS. 8 and 9 show the partitioning walls in more detail.

Figure 2:
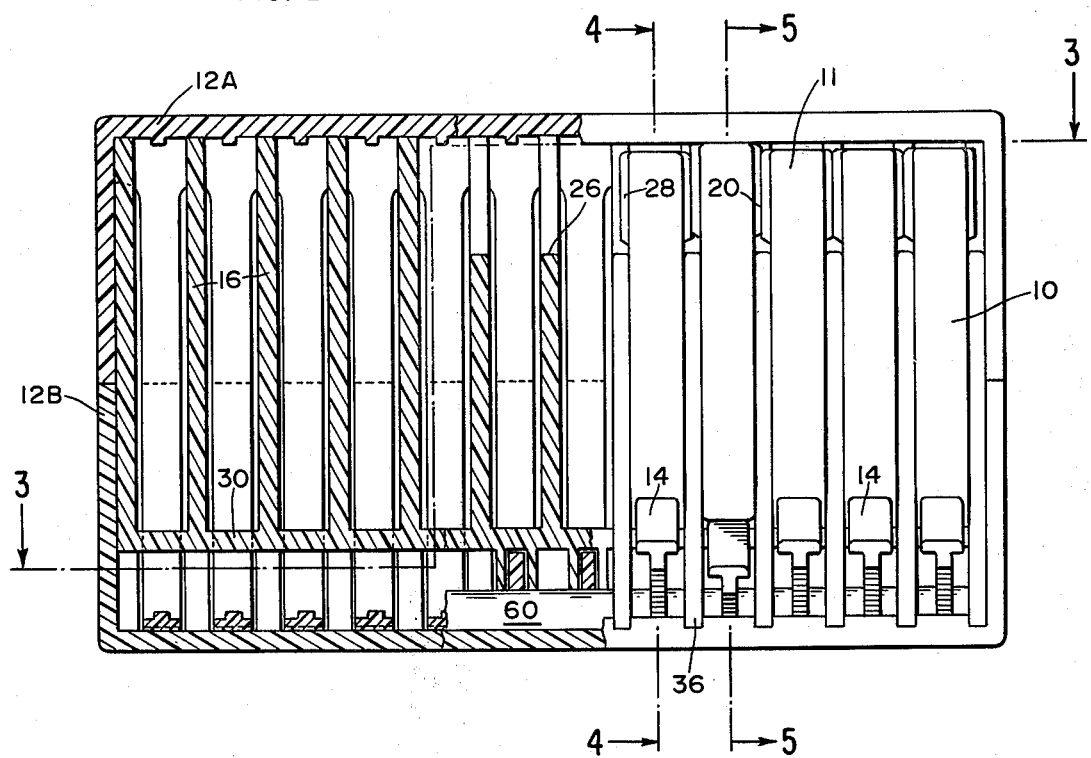
FIG. 2 is a front view which is partially cut-a-way of the dispenser shown in FIG. 1.

FIG. 2 is a front view of the dispenser shown in FIG. 1 with the left hand portion being cut-a-way at two different depths. Still further detail of the internal structure of the dispenser is shown by the cross sectional view of FIG. 3 which is taken along line 3—3 of FIG. 2. Furthermore, details as to the operation are shown in the cross sectional views of FIGS. 4 and 5.

One of the distinct advantages of the structure of the present invention is that the entire internal mechanism in the dispenser housing is actually fabricated in essentially only two parts. The partitioning structure including partitioning walls 16 is shown in FIGS. 8 and 9. The release mechanism including each key 14 is also of unitary construction and is shown in FIGS. 6 and 7 in a developed condition.

Figure 3:
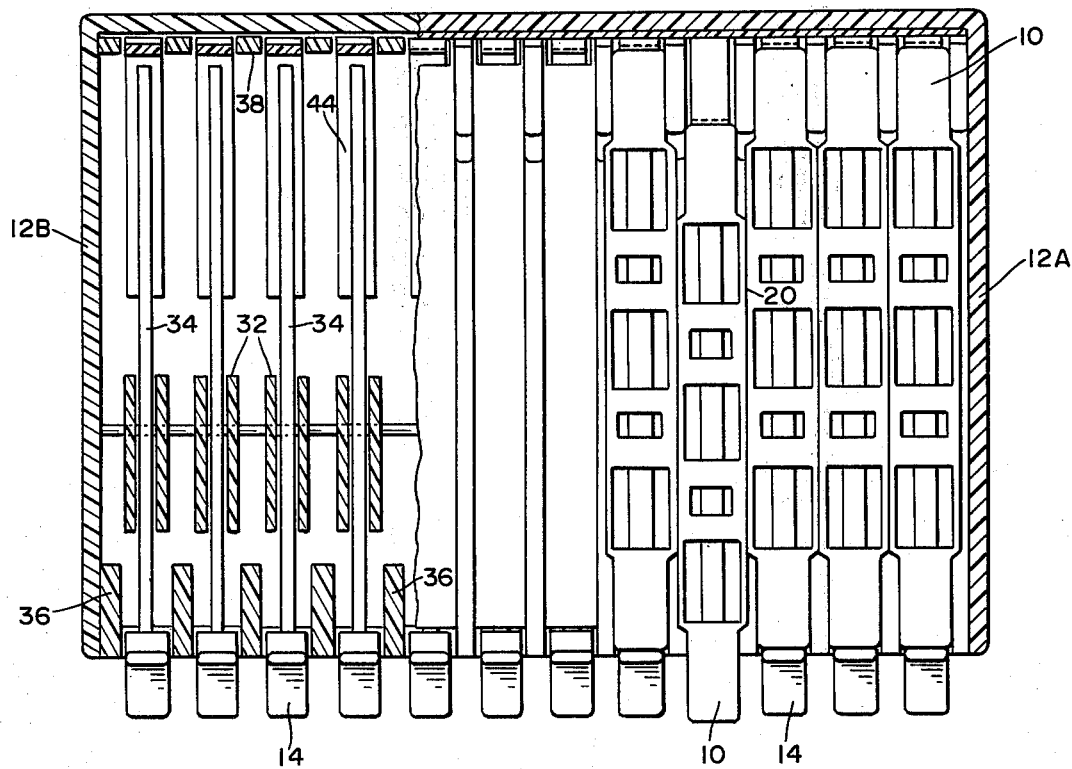
FIG. 3 is a cross sectional view taken along line 3-3 of FIG. 2.
Figure 4:
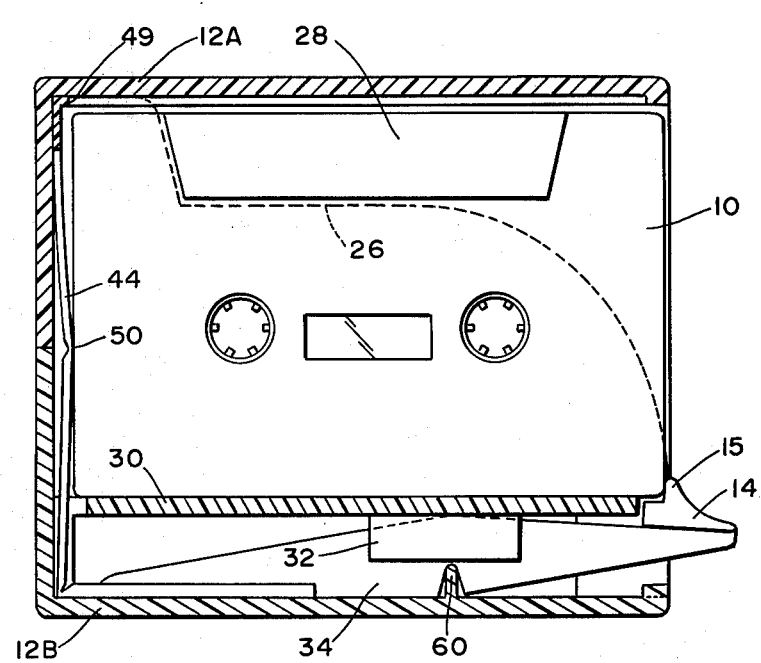
FIG. 4 is a cross sectional view taken along line 4-4 of FIG. 2.
Figure 5:
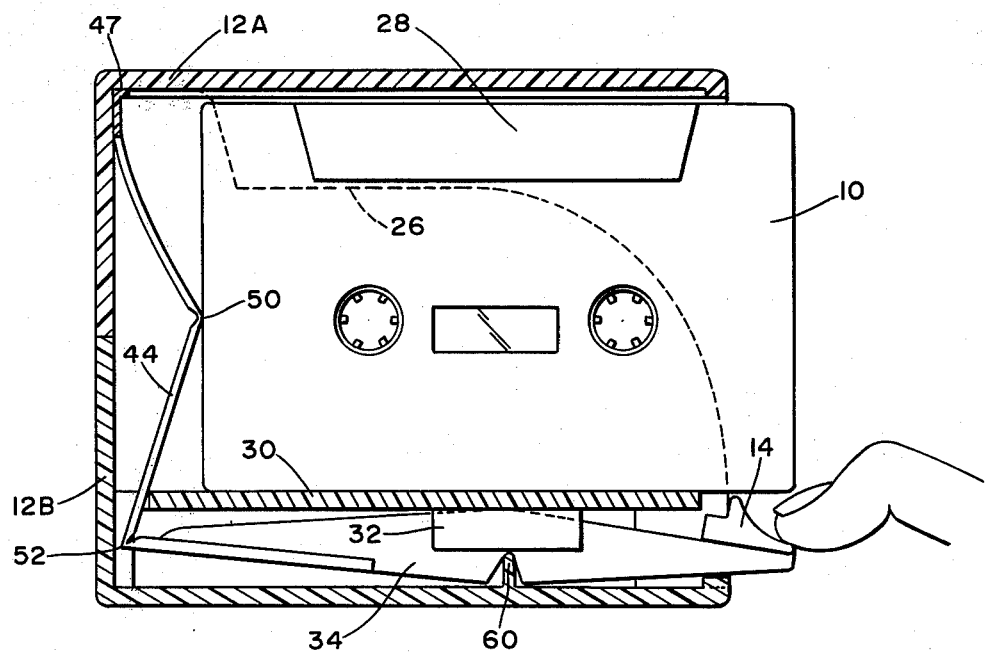
FIG. 5 is a cross section view taken along line 5-5 of FIG. 2 and showing the manner in which the key is actuated and the resulting discharge of the cassette.

With reference to the partitioning member which includes wall 16, reference is now made to FIGS. 2-5 and 8 and 9. The partitioning member 18, shown in FIGS. 8 and 9, is specifically constructed so as to permit the cassettes 10 to abut each other at their top slightly thickened end 11. FIGS. 2 and 3 clearly show this abutting relationship along line 20. In order to provide this abutting between tape cassettes the walls 16 from their top end 22 dip and sweep in an arc 24. FIGS. 4 and 5 clearly show the depressed surface 26 which, as shown, permits the thickened portion 28 of the cassette to fit thereabove.

The partitioning member 18 also comprises a bottom wall 30 having a plurality of ribs 32 depending downwardly therefrom. These ribs 32 are arranged in pairs as most clearly indicated in FIG. 3, and function as a guide way for the pivot arm 34 (see FIGS. 4 and 5).

Also, in connection with the partitioning member 18, the partitioning walls 16 each terminate at their bottom end in a forward leg 36 and a rear leg 38. FIG. 3 shows the legs 36 and 38 in cross section.

The other principle component of the dispenser is shown in a developed view in FIGS. 6 and 7. This component is the key release member 40 which is preferably constructed of plastic and is fabricated in a single comb-like structure. This member may be made by an injection molding technique.

Referring to FIGS. 6 and 7, the comb-like key release member 40 comprises a plurality of keys 14, a like plurality of pivot arms 34 connecting at one end to respective keys, a plurality of hinge arms 44, and a common interconnecting strip 46. The hinge arms 44 each have two relieved portion 50 and 52 which are shown in FIG. 7 and provide a hinging action at each of these points.

In assembling the parts of the dispenser of this invention, the key release mechanism 40 shown in FIGS. 6 and 7 is first disposed in the housing 12 or at least in the bottom section 12B of the housing. The partition member 18 is then slid into the dispenser seeing to it that the keys 14 line up properly between the legs 36 and that the pivot arms 34 line up between the pairs of ribs 32 as shown in FIG. 3.

The key release member is basically fixed at two points. The common interconnecting strip 46 is secured at its top lip 47 in a notch 49 (see also FIG. 8). The interconnecting strip 46 is further interlocked at this end by virtue of the bight sections 51 fitting within a further notch 53 in each of the walls 16 (see FIG. 9).

The other fixed reference point for the key release member 40 is provided by the short wall 60 which functions as a fulcrum for the pivot arm 34. The pivot arm 34 is provided with a notch 35 which pivots about the fulcrum wall 60. FIG. 7 shows the notch 35 in the pivot arm 34.

With reference to the operation of the dispenser of this invention, this is shown most clearly in FIGS. 4 and 5. It is noted that these cross sectional views are taken through the view of FIG. 2. FIG. 4 shows the cassette 10 secured in the dispenser and FIG. 5 shows the cassette having been selectively and releasably urged from the dispenser.

In FIG. 4 it is noted that the key 14 has an upwardly extending lip 15. As the cassette 10 is pushed into the accommodating compartment defined by walls 16, when it is in the approximate position as shown in FIG. 5, the hinge arm 44 is contacted and as the cassette 10 is pushed inwardly further the arm 44 hinges about point 50 and also about point 52 and the key 14 is pivotally urged upwardly. When the cassette 10 is pushed far enough inwardly, the point is reached where the lip 15 slides in front of the cassette 10 as depicted in FIG. 4 and essentially locks the cassette 10 in place against the bias provided by hinge arm 44.

Referring now to FIG. 5, this view shows the key 14 being depressed by a person's finger. When this happens the pivot arm 34 pivots about wall 60 and the hinge arm 44 hinges at both points 50 and 52. The point 52 hinge in effect is raised as indicated by the comparison between the positions shown in FIGS. 4 and 5, and the hinge point 50 must deflect forwardly as indicated in FIG. 5. Thus, when the key 14 is depressed, the cassette 10 is urged out of the dispenser by at least some small amount sufficient to enable the person to withdraw the cassette further. The force with which the cassette is expelled depends upon many factors but is primarily a function of the bias under which the hinge arm 44 is when the cassette 10 is locked in position.

One of the important features of the present invention, as previously mentioned, is that the internal parts of the dispenser are fabricated in essentially only two major parts and each of these parts can be made of a polypropolene or other flexible plastic material which enables the manufacturer to actually mold in the hinges provided at points 50 and 52. The comb-like key release structure is perferably made in one piece and is extremely easy to assemble and is certainly less expensive then complicated prior art key release structures. Although it is suggested that the member 40 be a single piece structure, it could also be fabricated in separate parts that are assembled. For example, the hinge arm 44 could be made separately from the pivot arm 34 and the key 14 could also be made separately and attached to the pivot arm 34.

Having described one embodiment of the present invention it should now be apparent to those skilled in the art that there are numerous modifications that can be made in this structure, all of which are contemplated as falling within the scope of the present invention. For example, and with particular reference to FIGS. 8 and 9, there has been shown a particular partitioning member having walls that are particularly adapted for providing an extremely compact structure wherein the cassettes at least at one part abut each other. In an alternate arrangement where the cassettes would not abut each other, relatively short ribs may extend from the top and bottom walls of the housing. Also, there has been shown one particular type of cassette. Obivously, this invention could be used to accommodate any-type of cassette or could also be used as a dispenser for other items such as packaged motion picture film or card decks.

What is claimed is:

1. A cassette dispenser comprising;
   a housing,
   means dividing the housing into a plurality of cassette accommodating compartments,
   a plurality of release keys, one being associated with each compartment and each having means for locking the cassette in the compartment when the key is not actuated including a lip for contacting a front edge of the cassette.
   means for supporting each key so that the key is movable to an actuated position,
   and means coupled from each key supporting means forming a hinge that is integrally formed with the supporting means and that contacts the cassette so that upon actuation of the key the hinge bends and urges the cassette from the housing.

2. The dispenser of claim 1 wherein said key supporting means includes a pivot arm having the key connected at one end thereof so that the key is positioned below a cassette and at the front of the housing.

3. The dispenser of claim 2 wherein said means for urging the cassette from the housing includes an elongated member having two bends or hinges formed therein one of which contacts the cassette at the rear of the housing.

4. The dispenser of claim 1 wherein said means dividing the housing includes a plurality of at least wall segments for guiding the cassette as it is slid into the housing.

5. The dispenser of claim 1 including means defining a floor for the cassette to rest upon, said floor defining a lower chamber in which is disposed the means for supporting each key.

6. A cassette dispenser comprising;
a housing,
means dividing the housing into a plurality of cassette accommodating compartments,
a plurality of release keys, one being associated with each compartment and each having means for locking the cassette in the compartment when the key is not actuated,
means for supporting each key so that the key is movable to an actuated position,
means coupled from each key supporting means forming a hinge that contacts the cassette so that upon actuation of the key the hinge bends and urges the cassette from the housing,
means defining a floor for the cassette to rest upon, said floor defining a lower chamber in which is disposed the means for supporting each key,
wherein said means for supporting each key includes a pivot arm and said housing has means defining a fulcrum for the pivot arm.

7. The dispenser of claim 6 wherein each key has an upstanding lip for engagement with an edge of the cassette to lock the cassette in place.

8. A cassette dispenser comprising;
a housing,
means dividing the housing into a plurality of cassette accommodating compartments,
a plurality of release keys, one being associated with each compartment and each having means for locking the cassette in the compartment when the key is not actuated,
means for supporting each key so that the key is movable to an actuated position,
means coupled from each key supporting means forming a hinge that contacts the cassette so that upon actuation of the key the hinge bends and urges the cassette from the housing,
said means dividing the housing including a plurality of at least wall segments for guiding the cassette as it is slid into the housing,
wherein said wall segments are open at the top so that the cassettes can abut each other at at least one section of the cassette.

9. A cassette dispenser comprising a housing having an open front, means sectioning the housing into a plurality of cassette accommodating compartments and a unitary release structure having a plurality of keys disposed at the open front of the housing below each cassette, a like plurality of pivot members each carrying a key at one end thereof, a like plurality of hinge arms each secured at one end to the other end of the pivot member and means for maintaining the other end of each hinge arm in a fixed position whereby upon actuation of the key the pivot member pivots causing the hinge arm to bend along a hinge line with the arm urging the cassette from the housing.

10. The dispenser of claim 9 wherein said unitary release structure has a comb-like structure with a common interconnecting bar typing all of the hinge arms together at their fixed end.

11. A cassette dispenser as set forth in claim 9 wherein each said hinge arm is integrally formed with its associated pivot member.

* * * * *